Aug. 16, 1966  N. KAMALIAN  3,267,182
METHOD OF CONSTRUCTING A ROCKET MOTOR
Original Filed March 26, 1963  3 Sheets-Sheet 1
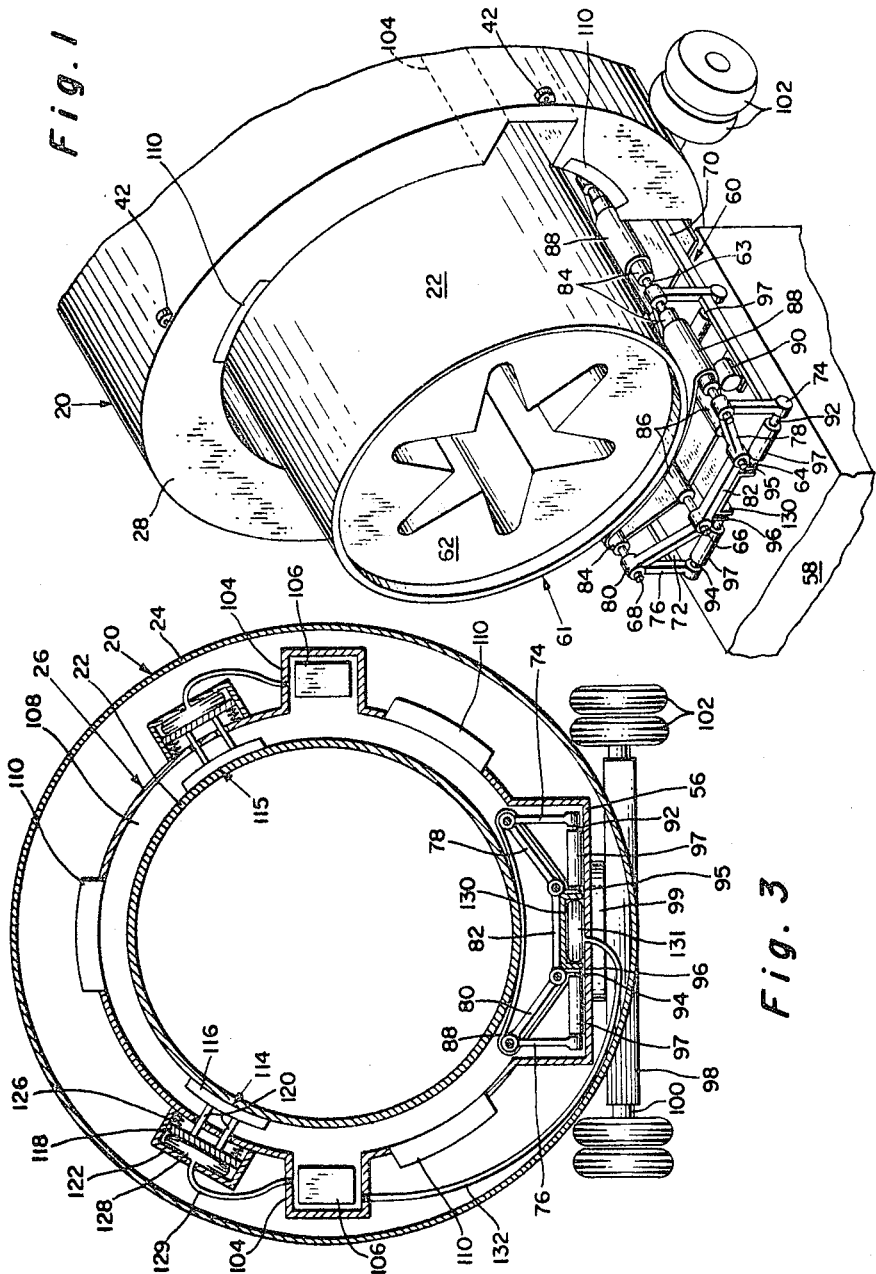
INVENTOR.
NEUBAR KAMALIAN
BY Ervin F. Johnston
George J. Rubens
ATTORNEYS

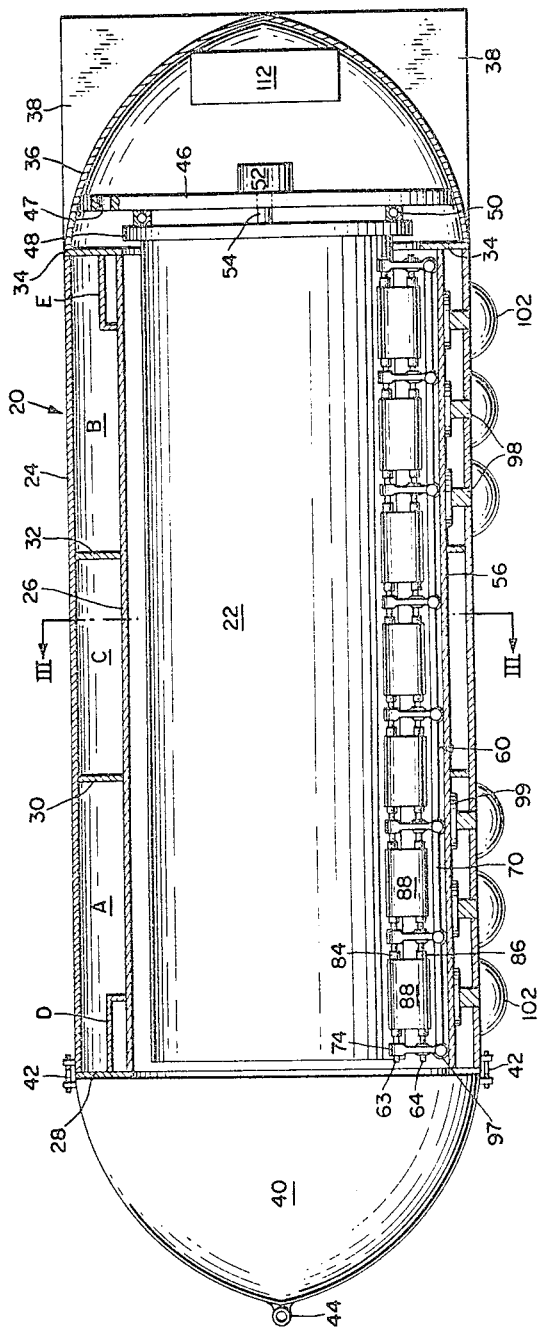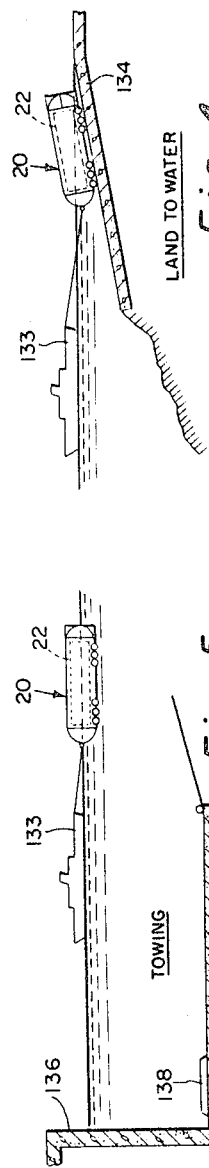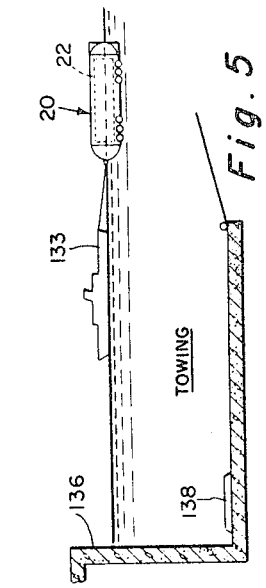

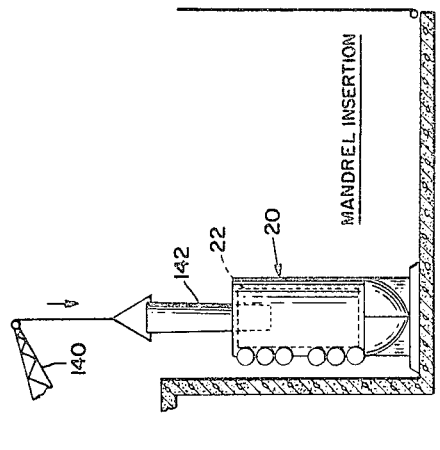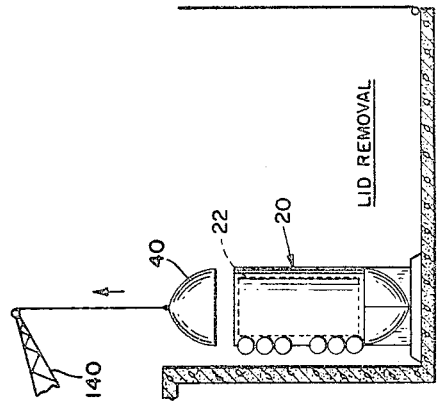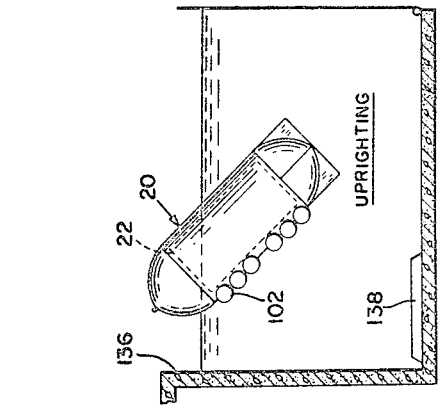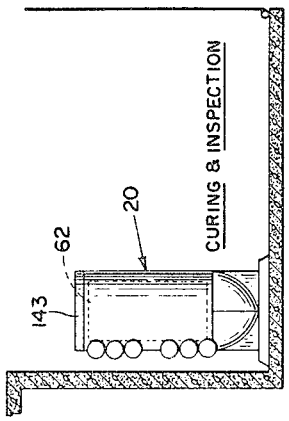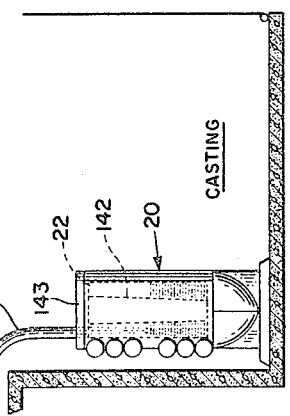

United States Patent Office 3,267,182
Patented August 16, 1966

3,267,182
METHOD OF CONSTRUCTING A ROCKET MOTOR
Neubar Kamalian, 1260 S. Westgate, Apt. 2,
Los Angeles 25, Calif.
Original application Mar. 26, 1963, Ser. No. 268,161, now Patent No. 3,185,454, dated May 25, 1965. Divided and this application Dec. 8, 1964, Ser. No. 423,623
1 Claim. (Cl. 264—3)

The invention described herein may be manufactured and used by or for the Government of the United States of America for governmental purposes without the payment of any royalties theron or therefor.

This is a divisional of copending application Serial No. 268,161 filed March 26, 1963, for "Device for Handling a Rocket Motor," now Patent No. 3,185,454.

The present invention relates to a method of handling a rocket motor and more particularly to a method of handling a rocket motor during the stages of construction thereof.

One of the most perplexing problems to those involved in the construction of large rocket motors has been the handling of the motors during various phases of construction thereof. With the requirement of high thrust rocket motors which will have the capability of carrying large payloads to the Moon and planets the problem of handling the tremendous weight of the motor during casting and curing has come to the foreground. Some requirements have been as high as 100 million pounds of thrust which calls upon construction facilities and methods far beyond those presently known.

The present invention has the capabilities of constructing rocket motors of practically unlimited size by handling the rocket motor in conjunction with a container. Construction of the rocket motor is commenced by placing the casing of the rocket motor on a bed of rollers and rolling the casing into the container. Once the casing is in the container, retainer means within the container are used to hold the casing in place and the container is sealed and rolled down to a body of water. Once in the body of water the container with the casing is floated and towed to a flooded drydock where the container is freed from a towed vehicle and placed in a vertical position. Water within the drydock is then withdrawn, allowing the container to come to rest on its end in the upright position within the drydock. A top cover of the container is then removed and the casing is readied for casting and curing the propellant required for the motor. The propellant can be easily poured into the rocket casing in the upright position. After the propellant is poured the container is sealed and means within the container applies heat to the propellant and rotates the motor to ensure uniform heat distribution. After casting and curing, the rocket motor can then be transcended back to a land position in a procedure substantially reverse to that described in getting it to the drydock. Accordingly, the present invention takes the rocket casing from a land position, utilizes water in positioning the shell for casting and curing the propellant and then returns the rocket motor via water to land and delivers the rocket motor without the necessity of handling the casing or the completed rocket motor with the normal implement as such as cranes and derricks. Accordingly, the invention prevents the rocket motor and especially the propellant grain from being subjected to localized or high stress concentrations.

An object of the invention is to provide a method of transcending a large casing of a rocket motor from a horizontal position to a vertical position for casting and curing a propellant within the casing and then returning the rocket casing with propellant to a horizontal position.

Another object of the present invention is to provide a method of contstructing a rocket motor.

A further object is to provide a method of constructing a rocket motor without handling the motor with derricks and cranes during the construction phases.

A still further object is to provide a method of constructing a rocket motor without subjecting the rocket motor or its propellant grains to localized or high stress concentrations.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is an isometric view of the rocket motor partially removed from the container.

FIG. 2 is a longitudinal schematic view of the container partially in cross-section with a rocket motor casing contained therein.

FIG. 3 is an enlarged cross-sectional view taken along line III—III of FIG. 2.

FIG. 4 is a side view showing the container with the rocket casing contained therein being towed from a land position to a body of water.

FIG. 5 is a side view of the container with the rocket casing being towed into a flooded drydock.

FIG. 6 is a side view of the container with the rocket casing being transferred from a horizontal position to a vertical position.

FIG. 7 is a side view of the container with the rocket casing resting in an upright position within the drydock which has been pumped dry.

FIG. 8 is a side view of the container with a mandrel being lowered within the rocket casing.

FIG. 9 is a side view of the container with a rocket propellant being poured within the rocket casing.

FIG. 10 is a side view of the container with the rocket motor being heated and cured in place.

Referring now to the drawings wherein like numerals designate like or corresponding parts throughout the several views, there is shown in FIG. 2 a cylindrical container 20 which contains a cylindrical rocket motor casing 22. The container 20 is constructed of an outer tube 24 which is concentrically positioned with respect to an inner tube 26 by annular partitions 28, 30, 32 and 34, the partitions 28 and 30 dividing the container into ballast tank A, the annular partitions 32 and 34 dividing the container into a ballast tank B, and the partitions 30 and 32 dividing the container into a compartment C.

Integral with the outer tube 24 is a bottom end of the container which includes an ogive shaped bottom cap 36 and fins 38, the fins 38 being integral with respect to the cap 36. Four of the fins 38 (only two being shown in FIG. 2) are to be employed with the fins being spaced 90° from one another so that the container 20 can be rested on the fins 38 in an upright position. A removable ogive shaped lid 40 is employed for the top end of the container 20 and is capable of making a watertight seal with the outer tube 24 and retained in placed by latches 42, the lid 40 having an eye 44 integral therewith for towing purposes.

Fixedly attached to the inner side of the cap 36 is an annular plate support 46 with circular openings 47 for supporting an annular platform 48 via a bearing 50 so that the platform 48 is capable of rotating with respect to the support 46. A motor 52 is rigidly mounted to the support 46 and has an output shaft 54 which extends through the support 46 and is fixedly attached to the platform 48 so that when the rocket motor casing 22 is resting on the platform 48 the motor 52, upon operation, will rotate the casing 22 about its longitudinal axis.

As shown in FIGS. 2 and 3 the inner tube 26 is recessed along its length into the tanks A and B and compartment C to form an elongate platform 56 which is to be capable of being co-planar with a land located platform 58.

An elongate train 60 is employed for moving the rocket casing 22 or a completed motor 61 having a propellant grain 62 from a horizontal position on the platform 58 to a horizontal position on the platform 56, the train 60 having a length slightly less than the length of the tubes 24 and 26. The train 60 is made up of four elongate spindles 63, 64, 66, and 68, these spindles being supported by an interconnection of longitudinal bars 70 and 72 with arms 74, 76, 78, 80 and 82, all of these arms be integral with one another and having hubs appropriate for mounting the spindles. Mounted on each of the spindles 63, 64, 66 and 68 are a series of rollers, 84 and 86. Around each set of rollers 84 and 86 is a belt 88 which is capable of rolling with the rollers 84 and 86 and supporting the rocket motor 61. The distance between the left roller 84 and the right roller 84, the vertical distance between the rollers 84 and the rollers 86 and the amount of sag in the belts 88 are to be such that the weight of the rocket motors 61 is to be taken up by the belt itself without the rocket motor 61 resting against any of the rollers 84 or 86. Mounted on the longitudinal bar 70 is a motor 90 which is connected to the spindle 63 in any suitable manner (such as chain and sprockets) for rotating the spindle 63, this in turn rotating all of the belts 88. Accordingly, when the rocket motor 61 is resting on the belts 88 the rocket motor can be rotated about its longitudinal axis when the motor 90 is in operation. Transverse the train 60 are a series of spindles 92 and 94, these spindles 92 being fixed in place between the arms 74 and a series of arms 95 between the arms 76 and a series of arms 96, the arms 95 and 96 being integral with arm 82. Mounted on each spindle 92 are rollers 97 which are capable of rolling the rocket motor 61 along either of the platforms 58 or 56.

Transverse the container 20 are a series of beams 98 which are mounted to a bottom-side of the platform 56 by a castor 99. Each beam 98 is journalled for an axle 100, each axle 100 in turn rotatably supporting wheels 102.

Interposed in the ballast tanks A and B are trim tanks D and E respectfully. The volume of the tanks A, B, D and E are to be such that the container with either the rocket casing 22 or the rocket motor 61 disposed therein can be floated in a body of water. The tanks A, B, D and E are to be of such a volume that upon individually ballasting these tanks the container 20 with either the rocket casing 22 or the rocket motor 61, can be oriented in either a horizontal position in the water or an upright position in the water or any intermediate position. The valving and the pumps that are required for interconnecting the tanks are fully set forth in U.S. Patent No. 3,135,162 issued June 2, 1964, to the present inventor and filed November 27, 1961.

The tube 26 has along its length diametrically opposed recesses forming elevator shafts 104 for receiving inspection elevators 106. Accordingly, after casting and curing the rocket motor 61 within the container 20 in an upright position the platform 48 can be used to rotate the rocket motor 61 while the elevators 104 take desired positions along the rocket motor 61 for inspection purposes such as coin-tapping or X-raying.

The inner tube 26 is to be spaced from the rocket casing 22 to form an annular space 108 therebetween. Recessed in the wall of the inner tube 26 are a plurality of heater-blower combinations 110, each of which extends substantially along the full length of the inner tube 26. An air conditioner 112 is mounted within the bottom cap 36 so as to be capable of constant temperature control of the entire container 20 and the rocket motor 61 housed therein.

A plurality of retainers 114 and 115 are employed for retaining the rocket casing 22 or the rocket motor 61 in place when horizontally positioned within the container 20. Each retainer runs substantially the full length of the inner tube 26 and has an elongate cradle 116 which is shaped to conform to the exterior of the rocket casing 22. The cradle 116 is connected to an elongate piston 118 by a series of braces 120 which extend through openings in the inner tube 26, the piston 118 being capable of reciprocating within a box 122 which extends substantially the full length of the inner tube 26. The inner tube 26 traps compression springs 126 against the piston 118. Interposed between the piston 118 and the box 122 is an elongate bladder 128 which upon inflation or deflation extends the cradle 116 against the rocket motor 62 or retracts the cradle therefrom respectively. An air hose 129 extends from the bladder 128 to the elevator shaft 104 for selectively inflating or deflating the bladder 128. The retainer 115 is identical to the retainer 114.

An elongated angled plate 130 is fixed to the bottom of the braces 82 and interposed between the plate 130 and the platform 56 is an elongate inflatable bag 131. An air hose 132 extends between the bag 131 and the elevator shaft for selectively inflating or deflating the bag 131. Accordingly, the train 60 can also be used as a retainer.

The construction of the rocket motor 62 within the container 20 is as follows: The train 60 is fully withdrawn from the container 20 and is resting on the platform 58. The rocket casing 22 is placed on the train 60 so as to rest directly on the belts 88. The train 60 is then rolled along the platform 58 onto the platform 56 within the container 20 until the rocket casing 22 is completely housed within the container 20. This operation is as substantially shown in FIG. 1 except the rocket casing does not have the propellant grain 62 therein. Air is then inserted into the bladders 128 and 131 so that the retainers 114 and the train 60 will rigidly hold the rocket casing 22 in place within the container 20. The lid 40 is then placed on the container and is rigidly held in place by latches 42 so as to make a watertight seal within the container.

The container 20 with the rocket casing 22 is then towed over land to a body of water after which a tug 133 tows the container 20 from a land position to a water position via a sloping ramp 134 as shown in FIG. 4. The tanks A, B, D and E are empty upon the container 20 becoming water-borne and the container will float in a horizontal position on the water. The container 20 is then towed into a flooded drydock 136 as shown in FIG. 5. As shown in FIG. 6, once the container 20 is within the drydock 136 the towline from the tug 132 is released and the ballast tank B or E or both are flooded so as to cause the container 20 to assume an upright position on the pad 138. When the container 20 is either hovering over the pad 138 or sunk to rest thereon the drydock 136 is pumped dry of the water.

As shown in FIG. 7 the lid 40 is removed from the container by a crane 140. A liner can then be placed within the empty motor case 22 and bonded thereto. After the liner is bonded to the motor case 22 and is inspected a mandrel 142 is lowered into the motor case 22 by the crane 140, as shown in FIG. 8, the larger cross-section of the mandrel being at the top or nozzle end of the rocket motor 61. A cap 143 is then sealed to the container 20 in place of the ogive lid 40 and a conduit 144 is sealably inserted therethrough. Propellant is poured into the motor case 22 around the mandrel 142 with the container either under pressure or under a vacuum depending upon the desired method for casting the propellant grain 62.

The conduit 144 is then withdrawn and the cap 143 is sealed after which the blower-heaters 110 are started so as to apply heat to the motor case 22. The heat is evenly distributed over the motor case 22 by rotating the motor case 22 with the propellant by the platform 48. The propellant grain 62 will receive a very even distribution of the heat after it is conducted to the grain by the rocket shell 22. This is a curing process of the propellant that will be applied for a predetermined period.

After the propellant is properly cured the blower-heaters 110 are turned off and the propellant and the container 20 are allowed to cool down to ambient temperature. The cap 143 is then removed and the mandrel is withdrawn.

Inspection of the propellant grain 62 is carried out by the use of coin-tapping or X-ray techniques. The elevators 106 will be moved along the length of the motor case 22 for inspecting the propellant grain. When one pass is completed, the rocket motor 61 is rotated to a next section and the elevator will make another pass. In this way the entire periphery of the rocket motor 61 can be inspected. If both elevators 106 carry out this operation the propellant grain 62 can be inspected by rotating the rocket motor 61 180°. Alternatively, one elevator can carry out the coin-tapping technique while the other elevator is taking X-rays. In this instance the rocket motor 61 must be rotated the full 360°, after which time the two inspection methods can be compared. The liner previously referred to, is bonded to the motor case 22 by the same method as that used for applying heat to the propellant grain 62. Further, the bonding of the liner is inspected in the same manner as the propellant grain 62.

After inspection of the propellant grain 62 the lid 40 is replaced on the tube 24 and sealed thereto and the completed rocket motor 61 is returned to land in a substantially reverse procedure as that explained in FIGS. 4 through 7. Upon arriving at a land location and within a proper storage area the rocket motor 61 can be withdrawn from the container 20 as shown in FIG. 1. At an appropriate time, either before or after inspection, a nozzle closure (not shown) is mounted on the nozzle end of the rocket motor 61.

As an alternative procedure the rocket motor 61 could be inspected on land rather than in the drydock. Accordingly, after pouring the rocket propellant and curing, the rocket motor could be returned to land and removed from the container 20 as shown in FIG. 1 after which the rocket motor can be rotated on the belts 88, once again employing the coin-tapping and X-raying techniques.

It is to be noted that after the rocket motor 61 is thoroughly inspected and the nozzle enclosure installed, the rocket motor can be transported via the container 20 to any desired location. This is accomplished by disposing the rocket motor 61 within the container 20, retaining it in place by use of retainers 114 and 115 and the train 60, after which the rocket motor 61 can be towed over land, on the water or in a submerged condition through the water. Further, it is to be noted that liquid motors can be handled in a like manner.

It is now readily apparent that the present invention solves many of the problems encountered in the manufacture of large rocket motors. Since the rocket motor is not handled by cranes or derricks there will be no problem of subjecting the rocket motor and especially the propellant grain to undue strains or localized stress concentrations.

Obviously many modifications and variations of the present invention are possible in the light of the above teachings. It is therefore to be understood, that within the scope of the appended claim, the invention may be practiced otherwise than as specially described.

I claim:

A method of handling an elongate rocket casing and casting and curing a solid rocket propellant therein comprising the steps of:
 (a) disposing the casing within a container;
 (b) sealing the container for water tight integrity;
 (c) floating the container with the casing in a body of water;
 (d) disposing the container within the water so that the casing assumes an upright position with the upper end of the container above the surface of the water;
 (e) opening the upper end of the container to expose the nozzle end of the casing;
 (f) pouring and casting propellant within the casing while the casing is in an upright position;
 (g) sealing the upper end of the container;
 (h) applying heat to the casing; and
 (i) rotating the casing in an upright position while applying said heat whereby the propellant within the casing is evenly cured.

References Cited by the Examiner

UNITED STATES PATENTS

| | | | |
|---|---|---|---|
| 2,940,390 | 3/1960 | Bergstrom et al. | 264—3 |
| 3,049,043 | 8/1962 | Milani et al. | 264—3 |
| 3,192,289 | 6/1965 | Jagiello | 264—3 |

BENJAMIN R. PADGETT, *Acting Primary Examiner.*

L. DEWAYNE RUTLEDGE, *Examiner.*